United States Patent [19]

Warchol et al.

[11] Patent Number: 5,602,209

[45] Date of Patent: Feb. 11, 1997

[54] CREPING ADHESIVE CONTAINING OXAZOLINE POLYMERS

[75] Inventors: Joseph E. Warchol, West Norriton; Cynthia D. Walton-Bongers, London Grove, both of Pa.

[73] Assignee: Houghton International, Inc., Valley Forge, Pa.

[21] Appl. No.: 457,590

[22] Filed: Jun. 1, 1995

Related U.S. Application Data

[63] Continuation of Ser. No. 352,371, Dec. 8, 1994, abandoned.

[51] Int. Cl.[6] .......................... C08G 63/91; C08G 65/32; C08L 67/00; C08L 71/00

[52] U.S. Cl. .......................... 525/410; 524/502; 524/503; 524/612; 525/58; 525/113; 525/186; 525/410; 525/411

[58] Field of Search ...................................... 525/410, 411

[56] References Cited

U.S. PATENT DOCUMENTS

| | | |
|---|---|---|
| 2,926,116 | 2/1960 | Keim . |
| 3,058,873 | 10/1962 | Keim et al. . |
| 3,483,141 | 12/1969 | Litt et al. . |
| 3,640,841 | 2/1972 | Winslow et al. . |
| 3,869,342 | 3/1975 | Munjat et al. . |
| 3,869,343 | 3/1975 | Munjat et al. . |
| 4,063,995 | 12/1977 | Grossman . |
| 4,064,213 | 12/1977 | Lazorisak et al. ................ 264/134 |
| 4,501,640 | 2/1985 | Soerens .............................. 162/111 |
| 4,528,316 | 7/1985 | Soerens .............................. 524/503 |
| 4,684,439 | 8/1987 | Soerens .............................. 162/111 |
| 4,788,243 | 11/1988 | Soerens .............................. 524/503 |
| 4,795,530 | 1/1989 | Soerens et al. .................... 162/111 |
| 4,994,146 | 2/1991 | Soerens .............................. 162/112 |

FOREIGN PATENT DOCUMENTS

| | | |
|---|---|---|
| 979579 | 12/1975 | Canada . |
| 56-136844 | 5/1989 | Japan . |

OTHER PUBLICATIONS

J. Frump, "Oxazolines Their Preparation, Reactions, and Applications", *Chemical Reviews*, 71(5):483–505 (1971).

T. Kagiya et al, "Ring–Opening Polymerization of 2–Substituted 2–Oxazolines", *Polymer Letters*, 4:441–445 (1966).

*Primary Examiner*—Ana Woodward
*Attorney, Agent, or Firm*—Howson and Howson

[57] ABSTRACT

A creping adhesive containing about 1% to about 25% polyoxazoline by weight, which imparts softness and resistance to bleaching, to a cellulosic web, and methods of using same are provided.

6 Claims, No Drawings

CREPING ADHESIVE CONTAINING OXAZOLINE POLYMERS

This is a continuation of U.S. patent application Ser. No. 08/352,371 filed on Dec. 8, 1994 now abandoned.

FIELD OF THE INVENTION

This invention relates generally to the field of manufacture of creping adhesives with application to tissue and toweling products, and particularly to the properties imparted by creping adhesives to the paper machine runnabilty and the resulting paper softness.

BACKGROUND OF THE INVENTION

In the manufacture of wet laid facial tissue, bathroom tissue or paper towels, the fibrous web may be creped in order to provide it with the desired characteristics, such as softness and bulk. The wet creping process involves adhering the web to a rotating creping cylinder, such as a Yankee dryer, and then removing the adhered web with a doctor blade. The doctor blade impacts the web causing the web to buckle and in doing so ruptures some of the fiber-to-fiber bonds within the web. The severity of this creping action depends upon a number of factors, including the degree of adhesion between the web and the surface of the creping cylinder. Greater adhesion generally causes increased softness. In order to increase the adherence of the fibrous web to the Yankee dryer, a creping adhesive is usually sprayed onto the surface of the creping cylinder to supplement any natural adhesion the web may have when applied to the creping cylinder.

A wide variety of creping adhesives are known in the art. The paper industry's demand for faster paper machine speeds, less down time due to doctor blade changes and paper breaks, and softer and more uniform paper necessitates development of new and better creping adhesives. Desirable qualities for new and better creping adhesives that will improve paper machine runnability include: increased adhesion, dispersibility, uniform coating, and resistance to bleach out.

SUMMARY OF THE INVENTION

In one aspect, the present invention provides a creping adhesive concentrate comprising about 0.01% to about 25% by weight solids, including a polyoxazoline, and a polyamide polymer resin. Preferably, the polyoxazoline is a polyethyloxazoline; and the resin is selected from the resins described below. The creping adhesive of the invention coats more evenly, allowing the surface of the paper to be more uniform and improving paper machine runnability. Additionally, this creping adhesive provides the paper with a higher adhesion than currently available products.

In another aspect, the invention provides a method for creping cellulosic paper by applying to a creping cylinder, or the cellulosic stock, the creping adhesive of the invention. When applied the creping adhesive concentrate of the invention is diluted to contain up to about 3% solids.

Other aspects and advantages of the present invention are described further in the following detailed description of the preferred embodiments thereof.

DETAILED DESCRIPTION OF THE INVENTION

The present invention provides a creping adhesive composition and methods of use which produce superior paper machine runnability in terms of adhesive strength, dispersibility, and resistance to bleach out in the creping and drying process of cellulosic webs useful for facial tissue, bathroom tissue, paper towels, or other such products. Bleach out is a decrease in adhesive strength of the creping adhesive due to addition of bleach in between dye changes.

I. The Creping Adhesive

Thus, the invention provides a creping adhesive concentrate formed of between about 5 to about 25% solids by weight, and preferably about 10% solids by weight. The solids comprise between about 1 weight percent (wt %) to about 5 wt % polyoxazoline, and preferably about 3 wt % polyoxazoline, between about 5 wt % to about 7 wt % polyamide polymer, and the balance water, but not excluding the use of other adjuvants including but not limited to corrosion inhibitors, preservatives, metal salts (e.g. sodium, potassium, and ammonium salts of borates, oxyanions, and phosphates), and pH adjusters. All percentages provided herein are by weight unless otherwise indicated.

A. The Oxazoline Polymers

The oxazoline polymers according to this invention are water-soluble, or at least dispersible in water at the concentrations employed. These polymers can be either substituted oxazoline homopolymers or copolymers. In either event, the polymers have recurring units of the general formula

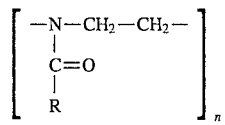

where R is any organic radical which does not significantly decrease the water-solubility or water-dispersibility of the polymers. However, R may be any substituent selected from the group consisting of a substituted or unsubstituted aryl group containing from 6 to 11 carbon atoms or a substituted or unsubstituted alkyl group containing from 1 to 11 carbon atoms. The substituent R may therefore be alkyl, such as methyl, ethyl, propyl, butyl, isobutyl, etc, or aryl, such as a phenyl group or substituted phenyl group. Preferably, the substituent R, in at least about 50 percent of said units, is alkyl containing from 1 to 11 carbon atoms. Most preferably, the alkyl is ethyl. The symbol n is an integer which provides said polymer with a molecular weight of from about 5000 to about 1,000,000, preferably 50,000 to 500,000. Generally, n is the molecular weight of the polymer divided by the molecular weight of the monomer. For example, the preferred monomer ethyloxazoline, has a molecular weight of 99.13 (~100). When the desired polyethyloxazoline molecular weight is about 5000, n is about 50; when the desired polyethyloxazoline molecular weight is about 1,000,000, n is about 10,000.

Thus, the polymers used in the creping adhesive may be homopolymers or copolymers depending upon whether the substituents R are the same for all units of the above formula or are different. In the case of copolymers, they may be either heteric or block copolymers.

Particularly preferred oxazoline polymers of this invention are polyethyloxazolines having molecular weights in the range of about 5000 to about 500,000 daltons. Such homopolymers are thermoplastic, amorphous solids which are water-soluble and have low toxicity. One such homopolymer is poly(2-ethyl-2-oxazoline) which has a molecular weight of about 500,000 and a structure as follows:

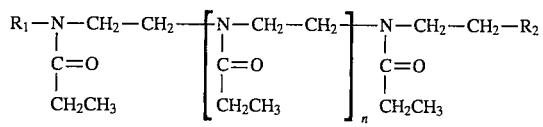

where n is about 5,000, providing a molecular weight of about 500,000.

The monomers from which the polymers of this invention are formed may be prepared according the procedures described in Chemical Reviews, 71, No. 5, pages 483–505 (1971), incorporated herein by reference. Suitable illustrative monomers include 2-methyl, 2-ethyl, and 2-isobutyl-2-oxazoline and mixtures of these monomers.

The polymers, whether homopolymers or copolymers, used in the process of this invention may be prepared by polymerizing the monomers or comonomers in a suitable manner. According to U.S. Pat. No. 3,483,141, the monomers may be reacted in an inert atmosphere in the presence of a cation catalyst at a temperature of about 20° C. to 250° C. See also Polymer Letters, 4, pages 441–445 (1966).

The polymerization temperature preferably is in the range of from about 80° C. to 250° C., with reaction times of several hours. These reaction times can vary somewhat depending upon the reactants, polymerization temperature, catalyst type and concentration, and the desired molecular weight.

Typical of the cationic catalysts which may be used in the polymerization reaction are alkyl halides such as methyl iodide and 1,4-dibromobutane; boron-fluorine compounds such as boron trifluoride etherate, strong acids such as p-toluene sulfonic acid, sulfuric acid, nitric acid and the like. The concentration of catalyst can vary considerably so that the mole ratio of monomer to catalyst is from about 10:1 to 60,000:1.

B. The Polyamide Resin

The polyamide resin component of the creping adhesive of this invention may be included in an amount up to that concentration which produces gel. For example, the polyamide resin may make up between about 1–25 wt % of the total solid content in the creping adhesive concentrate. This polyamide resin can be selected readily by one of skill in the art from among known and commercially available resins. Suitable resins known to those of skill in the art include but are not limited to the polyamide resins provided in the Code of Federal Regulations (CFR) 21 parts: §176.170, §175.300 and §176.180, which are incorporated by reference herein.

Particularly well suited for use in the creping adhesive of the invention are the polyamide resins described in Munjat, U.S. Pat. No. 3,869,342 and U.S. Pat. No. 3,869,343, incorporated by reference herein. One desirable resin has the composition of Table I, which contains approximately 15% solids. Other polyamide resins described in these latter patents are also desirable for use in the adhesive compositions of this invention.

The polyamide resin component of the preferred embodiment is a polyamide-epichlorohydrin resin that has a polyamide base polymer consisting of the reaction product of itaconic acid, diethylenetriamine, and caprolactam (see Table I part B). The polyamide base polymer is then crosslinked by epichlorohydrin and the pH adjusted with sulfuric acid to produce the polyamide-epichlorhydrin resin used in the preferred embodiment (see Table I part A).

TABLE I

| Part A: Components | Percentage, by weight |
| --- | --- |
| polyamide base polymer | 15–25 |
| H₂O | 60–80 |
| epihalohydrin | 1–8 | where the polyamide base polymer contains approximately 50% solids and is formed by the reaction of:

| Part B: | |
| --- | --- |
| caprolactam | 15–25 |
| H₂O | 21–55 |
| itaconic acid | 20–40 |
| diethylene triamine | 15–30 |

Desirably, the halogen of the epihalohydrin of these formulations is chlorine. However, other suitable halogens, e.g. bromide, may be readily substituted by one of skill in the art. This formulation for a suitable polyamide resin may be adjusted as needed or desired. For example, one of skill in the art can readily substitute a suitable polybasic carboxylic acid, a diacid, or a triacid, for itaconic acid. Examples of suitable substitutes include sebacic acid, dodecanedioic acid, dimers or trimers of oleic acid, reactions with acrylic acid and the like. Similarly, one of skill in the art can readily substitute another amine base for the exemplified diethylene triamine used in the resin. See 21 C.F.R. §176.170, §175.300, and §176.180 for examples of other suitable acids and bases which may be used in the preparation of the resins.

As another example of a polyamide resin formula, one of skill in the art can readily select an alternative pH adjuster and thus, substitute another appropriate acid or base capable of adjusting the pH to between about 4 to about 8 for the sulfuric acid (see example 1). One of skill in the art can readily substitute an inorganic acid such as phosphoric acid or an organic acid such as citric acid for the exemplified sulfuric acid used to adjust the pH. Similarly, one of skill in the art can readily select from among the known preservatives. For example, suitable preservatives include KATHON®, PABA®, and triazines.

C. Water

The water used in preparing the compositions of the invention is preferably soft water, i.e., water which is free of calcium and magnesium, although such soft water is not a requirement. Prior to use, a creping adhesive concentrate of the invention is diluted using water to about 0.01 percent to about 4 percent solids.

D. Optional Components of Creping Adhesive Concentrate

Other optional components may be readily added into the above polyoxazoline and polyamide resin formulations. Such optional components may include, for example, corrosion inhibitors to prevent rust formation of the dryer, such as salts of carboxylic acids and/or sodium nitrite.

Additionally, or as an alternative to adding the optional ingredients discussed above (e.g. pH adjusters, corrosion inhibitors, and preservatives) into the creping adhesive concentrate, such components may be added at the time of dilution. The pH of the creping adhesive concentrate is adjusted to a pH of between 4 and 8, to avoid corrosion of the dryer, desirably, the preferred pH of the creping adhesive of the invention is 6.

Currently, the presently preferred embodiment of the creping adhesive of the invention contains about 7% of the polyamide-epichlorohydrin (anhydrous) resin of Example 1, about 3% polyethyloxazoline with a molecular weight of about 500,000, corrosion inhibitors (preferably 0.6% sebacic acid, 0.55% triethanolamine, and 0.25% monoethanolamine), 0.2% preservative (preferably KATHON®), and the balance water. The addition of 3% polyethyloxazoline has been found to increase the adhesive strength of the polyamide resin by about 20%. This resulting composition, creping adhesive A is described in detail in Example 2 and is about 10±0.5% solids as determined by a conventional evaporation test, has a pH of between 5.8 and 6.4.

Alternatively, the creping adhesives of the invention may comprise polyoxazoline with multipolymer systems, rather than the two polymer systems described above. For example, the polyoxazoline may be combined with such components as polyvinylamides, polyvinylalcohols (PVA), glyoxylated polyvinylamides, polyethylene oxide, polyethylenimine, polyvinylpyrrolidone, and CARBOWAX® polyethylene glycols. As with other polymer systems, polyoxazoline can be readily added into these multipolymer systems. Desirable formulations includes a combination of polyvinylalcohol and polyethyloxazoline; a combination of polyethylenimine and polyethyloxazoline; and a combination of modified polyethylenimine and polyethyloxazoline.

This creping adhesive, and all the adhesives of the invention, are used by applying it to a creping cylinder, e.g. a Yankee Dryer, or equivalent equipment, for example by spraying directly onto a dryer.

II. Methods of Use

Thus, the present invention provides a method for manufacturing paper products. The method of the invention provides improved dispersibility, adhesion, coating and thus, paper machine runnability, i.e., there are fewer problems in paper runs and thus a decrease in the number of times a machine must be stopped and re-started. Thus, the use of the creping adhesive of the invention results in more usable paper, which has even edges and color and fewer holes. The method of the invention also improves resistance to bleach out when paper colors are changed. Improved paper softness may also result.

The method of the invention involves applying the creping adhesives of the invention to a creping cylinder or dryer. Preferably, the creping adhesives of the invention are diluted with water, as defined above, so that the resulting percentage of solids in the diluted composition are about 0.1% to about 5% by weight. Alternately, one of skill in the art could apply the polymers individually or in combination to the creping cylinder or dryer.

Preferably, the creping adhesives of the invention are applied directly to a drying cylinder used in the preparation of cellulosic web used to make tissue products. For example, the creping adhesives are desirably sprayed onto the cylinder, e.g. a Yankee dryer, at a rate of between about 25 to 100 cc/minute, and preferably about 30 cc/minutes, operating at ambient temperature However, one of skill in the art may adjust this rate as needed, depending upon such variables such as, e.g., furnish, stock, creping adhesive concentration, other chemicals present, and the dryer conditions.

Optionally, the creping adhesives of the invention may be applied to the drying cylinder in conjunction with other agents. In one particularly desired embodiment, the creping adhesive of the invention is applied in conjunction with a release agent. Such release agents are well known to those of skill in the art. For example such agents may include oils, emulsions, dispersions, and surfactants, which are known to those of skill in the art.

Typically, the creping adhesive and release agent are sprayed using separate feed lines and either the same or different spray booms. During application, adjustments in the concentrations of these components are made based upon visual inspection of the dryer, sensory equipment analysis of the dryer and paper during the run, and analysis of the resulting paper. Advantageously, it has been found that the creping adhesive of the invention requires the use of a smaller amount of release agent than do conventional, known creping adhesives.

The following examples illustrate the preferred methods for preparing and using the creping adhesives of the invention. These examples are illustrative only and do not limit the scope of the invention.

EXAMPLE 1

Preparation of a Polyamide Resin

The following provides the components of a preferred polyamide resin in the order in which these components are reacted together.

TABLE II

| Part A: Components: | Percentage, by weight |
|---|---|
| Polyamide base polymer | 20.8 |
| $H_2O$ | 74.2 |
| epichlorohydrin | 4.6 |
| $H_2SO_4$ | 0.2 |
| preservative | 0.2 |
| | 100.0, | where the polyamide base polymer contains approximately 50% solids and is formed by the reaction of:

| Part B: | |
|---|---|
| caprolactam | 17.98% |
| $H_2O$ | 26.41 |
| itaconic acid | 31.02 |
| diethylene triamine | 24.59 |
| | 100.00 |

The polyamide-epichlorohydrin resin and the polyamide base polymer were prepared using the processes described in U.S. Pat. No. 3,869,342 and U.S. Pat. No. 3,869,343.

EXAMPLE 2

Preparation of a Creping Adhesive

An exemplary creping adhesive of the invention, creping adhesive A, was prepared as follows.

To a reactor, which has top agitation and is equipped with a nitrogen gas inlet for the bottom of the tank, with was charged with about 37.2% polyamide-epichlorohydrin resin of Example 1 and soft water. Then a corrosion inhibitor consisting of about 0.6% sebacic acid, about 0.55% triethanolamine, and about 0.25% monoethanolamine were added, in order. The mixture was heated to 100° F. and mixed until fully dissolved. The pH was adjusted, if necessary, to about 6.1±0.3 with sebacic acid or monoethanolamine. While mixing, about 3 wt % of the 500,000 MW polyethyloxazoline was added and blended until all of the polyoxazoline had fully dissolved. The mixture was then sampled to confirm that it was a clear, amber liquid, having a pH (neat) between 5.8–6.4, and 10.0±0.5% solids. The mixture was then drawn through a 40–80 mesh strainer.

EXAMPLE 3

Trial on Tissue Machine

A creping adhesive prepared according to Example 2 was compared with a commercially available creping adhesive (not containing polyethyloxazoline). The machine used was a suction breast roll machine which makes exclusively 9.2#(basis weight) two ply bathroom tissue products.

A. Test A—Prior Art Run

To repair a low spot in the dryer, the mill had to spray metalize the front edge of the dryer with a stainless steel coating. Shortly afterwards, a continuous creping system was installed. The continuous creping system is designed for use with an index blade steel. Soon after the installation of the creping system, the system was found to be unable to run in the continuous mode due to a rough area where the stainless steel was bonded to the cast iron. As the blade contacted the front edge, it became worn and caused drag marks on the sheet and tears on the front edge.

The mill attempted to solve this problem using other commercially available adhesive products as instructed by the manufacturer to attempt to obtain improvement in the ability to run the continuous blade system.

B. Test B

Creping adhesive A, prepared as described in Example 2 above, and a release agent comprising emulsifiable mineral oil [Houghton] were used in this test run.

The conditions for the run were as follows.
Fabric—LINDSAY®, run for one week;
Felt—ALBANY®, run for 30 days;
Refiners—80 AMPs;
Crepe angle—16° C.;
Blade bevel—0
Set up angle—1⅛
Basis weight—9.1
Wire speed—4615 FPM (feet per min)
Reel speed—3649 FPM
Yankee Steam Pressure—140 pounds per square inch (psi)
Yankee steam rate—25 psi/hour
Yankee Differential—13.2
Wet End Hood—686° F.
Dry End Hood—686° F.
Crepe Blade Pressure—45 psi
Coating—30 cc/min
Release 40 cc/min
Average Yankee surface Temperature—190° F.

During the trial the machine was taken through a variety of color changes and subsequent bleach out. The effect on the coating was negligible. In contrast, under these conditions, other, commercially available, polyamide resin adhesives would be removed from the dryer.

EXAMPLE 4

Adhesive Strength Tests

This example provides data showing the adhesive strength of exemplary creping adhesives of the invention as measured on the Tinius-Olsen Testing Machine Model 5000 [Tinius Olsen Testing Machine Co.; Willow Grove, Pa.] by a 180° Peel Test Method, which is a modification of the ASTM method D903.

A. Sample Preparation:

1. Steel plates [Catalog No. 101-A-2, SAE 1010 cold rolled heavy gauge steel plates, Metaspec Co.; San Antonio, Tex. or equivalent] were submerged in a petroleum ether bath for at least 2 hours to remove the rust preventative coating. The plates were then washed with CERFAK® 1400 surfactant, rinsed with acetone, and then air-dried.

2. 1"×8" non-woven fabric strips (cut from interfacing; 30% natural cellulose/70% polyester, Staple Sewing Aids Corp., N.J.) were cut from the bulk interfacing material such that all strips were cut in the same direction and so that the same side of the fabric adhered to the metal plate.

3. The fabric strips were placed in the test solutions and thoroughly soaked for at least 15 minutes. A minimum of two strips was run per sample.

After soaking, the fabric strips were removed from the solution and allowed to drip off. Next the strips were placed onto the metal surface so that one end of the fabric strip was flush with the edge of the metal plate. The strip was centered.

The fabric strip was smoothed onto the metal surface such that no air bubbles formed under the fabric strip. A "fabric tail" of 3 inches served as the end placed into the testing machine's upper clamp.

4. The fabric coated plate was then placed onto a preheated (15 minutes minimum) Corning Hot Plate Stirrer (model #PC351) on setting 4 (480° F.) for four minutes (the thinner plates were cured on low (180°–200° F.) for four minutes). After heating, the sample was allowed to cool to room temperature. The fabric "tail" may be blotted to hasten its drying.

5. The sample plate was placed in the testing machine's lower clamp, after first debonding about 1" of the bound fabric from the metal plate. The fabric "tail" was 180° from the upper clamp. The "tail" was then placed into the testing machine's upper clamp such that it was bent back upon itself.

6. Tinius Olsen Machine Settings:
Force=50%=2.50 lbs.
Ext.=100=5.0 in.
Speed=2.50 in./min.

7. The Tinius Olsen Testing Machine evenly pulled the fabric strip from the metal plate while simultaneously recording the adhesive force and distance the cross-hair has travelled.

8. Adhesive strength measurements were reported as Force per width of adhesive strip. Force measurements were between 15–85% of load cell weight.

The purpose of the Peel Test is to test additives and alterations to the creping adhesives of the invention. Adhesive strength was related to the effectiveness of the Yankee Dryer creping process. A linear response between force and % adhesive was obtained for the polyamide resin of Example 1.

B. Adhesion Study A

To demonstrate that the components of the invention are synergistic, not additive in effect, dual samples of the polyamide resin of Example 1 with (a) polyethyloxazoline low molecular weight (approx. 50,000), (b) polyethyloxazoline having a molecular weight of approx. 200,000 MW or (c) polyethyloxazoline having a molecular weight of approx. 500,000 MW, were run on the above-described test. In addition, blanks of each version of polyethyloxazoline (no polyamide resin) were run. The adhesive strength data are provided in Table III below.

TABLE III

| | Adhesive Strength Pounds per inch |
|---|---|
| Polyamide Resin | 1.377 |
| Polyamide Resin + 1% polyethyloxazoline (50,000 MW) | 1.416 |
| 1% polyethyloxazoline (50,000 MW) | 0 |
| Polyamide Resin + 1% polyethyloxazoline (200,000 MW) | 1.590 |
| 1% polyethyloxazoline (200,00 MW) | 0 |
| Polyamide Resin + 1% polyethyloxazoline (500,000 MW) | 1.700 |
| 1% polyethylxazoline (500,000 MW) | 0 |

The polyamide resin of Example 1 only and polyethyloxazoline only controls were run. None of the polyoxazoline only control solutions produced a test sample with any adhesion. Each combination of the polyamide resin of Example 1 and a polyethyloxazoline demonstrated increased adhesion in comparison to a control containing only the polyamide resin of Example 1. The composition containing polyethyloxazoline (500,000 MW) version showed the greatest increase in adhesive strength.

C. Adhesion Study B

The purpose of this test was to evaluate a higher concentration of polyethyloxazoline in the creping adhesive of the invention. This creping adhesive contained the polyamide resin of Example 1 composition in combination with 5 wt % polyethyloxazoline. The resulting data are provided in Table IV below.

TABLE IV

|  | Adhesive Strength Pounds per inch |
|---|---|
| Polyamide Resin | 1.31 |
| Polyamide Resin + 1% polyethyloxazoline (500,000 MW) | 1.70 |
| Polyamide Resin + 5% polyethyloxazoline (500,000 MW) | 1.79 |

The 5% polyethyloxazoline sample had greater adhesion than the 1% polyethyloxazoline sample.

Numerous modifications and variations of the present invention are included in the above-identified specification and are expected to be obvious to one of skill in the art. Such modifications and alterations to the compositions and processes of the present invention are believed to be encompassed in the scope of the claims appended hereto.

What is claimed is:

1. A creping adhesive concentrate consisting essentially of about 1 percent to about 25 percent of an oxazoline polymer by weight and a polyethyleneimine.

2. The creping adhesive concentrate according to claim 1, wherein the oxazoline polymer has the repeating unit:

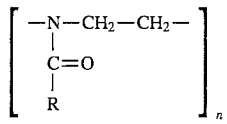

where R is selected from the group consisting of an aryl group containing from 6 to 11 carbon atoms or an alkyl group containing from 1 to 11 carbon atoms, and n is an integer which provides said polymer with a molecular weight of from about 5000 to about 1,000,000.

3. The creping adhesive according to claim 2, wherein the molecular weight of the oxazoline polymer is between about 50,000 to about 500,000.

4. The creping adhesive according to claim 1 wherein the oxazoline polymer is polyethyloxazoline.

5. The creping adhesive according to claim 4 wherein the polyethyloxazoline has a molecular weight of about 500,000.

6. The creping adhesive according to claim 1 wherein said oxazoline polymer is present in an amount of about 3 percent by weight.

* * * * *

UNITED STATES PATENT AND TRADEMARK OFFICE
CERTIFICATE OF CORRECTION

PATENT NO. : 5,602,209
DATED : February 11, 1997
INVENTOR(S) : Joseph F. Warchol and Cynthia D. Walton-Bongers It is certified that error appears in the above-indentified patent and that said Letters Patent is hereby corrected as shown below:

ON THE TITLE PAGE:

Section [75] Inventors, delete the middle initial "E." in the first inventors' name and insert in place thereof -- F. --.

Col. 5, line 49, after "temperature", insert -- . --.

Signed and Sealed this

Eighth Day of July, 1997

Attest:

BRUCE LEHMAN

*Attesting Officer*     *Commissioner of Patents and Trademarks*